US010637767B2

(12) United States Patent
Nauck et al.

(10) Patent No.: US 10,637,767 B2
(45) Date of Patent: Apr. 28, 2020

(54) DETERMINATION AND USE OF LINK PERFORMANCE MEASURES

(71) Applicant: BRITISH TELECOMMUNICATIONS public limited company, London (GB)

(72) Inventors: Detlef Nauck, London (GB); Vidhyalakshmi Karthikeyan, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 604 days.

(21) Appl. No.: 14/914,733

(22) PCT Filed: Aug. 29, 2014

(86) PCT No.: PCT/GB2014/000337
§ 371 (c)(1),
(2) Date: Feb. 26, 2016

(87) PCT Pub. No.: WO2015/028774
PCT Pub. Date: Mar. 5, 2015

(65) Prior Publication Data
US 2016/0218963 A1     Jul. 28, 2016

(30) Foreign Application Priority Data

Aug. 30, 2013   (GB) ................... 13250099.2

(51) Int. Cl.
*H04L 12/721*     (2013.01)
*H04L 12/24*      (2006.01)
(Continued)

(52) U.S. Cl.
CPC .......... *H04L 45/123* (2013.01); *H04L 41/142* (2013.01); *H04L 41/16* (2013.01);
(Continued)

(58) Field of Classification Search
CPC ..... H04L 45/123; H04L 41/142; H04L 41/16; H04L 45/302; H04L 45/70; H04L 47/20; H04L 65/80; H04L 1/0026
See application file for complete search history.

(56) References Cited

U.S. PATENT DOCUMENTS 5,831,972 A * 11/1998 Chen .................. H04Q 11/0478
370/230
2006/0274760 A1   12/2006 Loher
(Continued)

FOREIGN PATENT DOCUMENTS

JP      2007-221424      8/2007
WO    WO 2011/117570    9/2011
(Continued)

OTHER PUBLICATIONS

International Search Report for PCT/GB2014/000337 dated Oct. 29, 2014, three pages.
(Continued)

*Primary Examiner* — Shukri Taha
(74) *Attorney, Agent, or Firm* — Nixon & Vanderhye P.C.

(57) ABSTRACT

Methods and apparatus for determining and using link performance measures ($D_L$, $C_L$) in respect of communication links (125) in a cata communication network (100) are disclosed, where the network comprises a plurality of data-forwarding nodes (120) each capable of forwarding data along a plurality of communication links (125). Link performance measures ($D_L$, $C_L$) are determined in dependence on end-to-end path performance measures (Es,u) received in respect of a plurality of end-to-end paths having at least one link in common, and on the basis of route information (Rs,u) identifying the links of which those end-to-end paths are comprised. Methods are disclosed for using link performance measures in relation to decisions regarding the routing and/or re-routing of data in a network, and in relation to
(Continued)

System diagram showing network and entities involved determining measures indicative of expected quality of experience in respect of data traversing end-to-end paths across a network.

8 Claims, 6 Drawing Sheets

(51) Int. Cl.
    *H04L 12/725*     (2013.01)
    *H04L 12/813*     (2013.01)

(52) U.S. Cl.
    CPC ............ *H04L 45/302* (2013.01); *H04L 45/70* (2013.01); *H04L 47/20* (2013.01); *H04L 41/147* (2013.01)

(56) References Cited

U.S. PATENT DOCUMENTS

2007/0091811 A1     4/2007     Thubert et al.
2008/0080376 A1     4/2008     Adhikari et al.

FOREIGN PATENT DOCUMENTS

WO     WO 2012/085498     6/2012
WO     WO 2012/085519     6/2012

OTHER PUBLICATIONS

Written Opinion of the ISA for PCT/GB2014/000337 dated Oct. 29, 2014, seven pages.
Applicant's Written Comments on the Written Opinion of the ISA for PCT/GB2014/000337 dated Jun. 23, 2015, three pages.
International Preliminary Report on Patentability for PCT/GB2014/000337 dated Nov. 25, 2015, eight pages.
EP Search Report for EP13250099.2 dated Nov. 29, 2013, three pages.
H. Tran et al., "QoE Content Distribution Network for Cloud Architecture", *2011 First International Symposium on Network Cloud Computing and Applications—IEEE Computer Society*, 2011, pp. 14-19.

* cited by examiner

Figure 1: System diagram showing network and entities involved

Figure 2: Example network with 13 links and 9 routes

Figure 3 – Example Process for Updating Values of Diagnostic Measures $D_L$ for Links in a Network Figure 4 – Example Process for Updating Values of Cost Measures $C_L$ for Links in a Network Figure 6 – Computing Routes Predictively or Reactively using Link Performance or Cost Measures

DETERMINATION AND USE OF LINK PERFORMANCE MEASURES

This application is the U.S. national phase of International Application No. PCT/GB2014/000337 filed 29 Aug. 2014 which designated the U.S. and claims priority to EP Application No. 13250099.2 filed 30 Aug. 2013, the entire contents of each of which are hereby incorporated by reference.

TECHNICAL FIELD

The present invention relates to methods and apparatus for determining link performance measures in respect of communication links in a data communication network and using such link performance measures in relation to decisions regarding routing and/or re-routing of data in the network, where the network comprises a plurality of data-forwarding nodes each capable of forwarding data along a plurality of communication links. Further aspects of the present invention relate to methods of forwarding data in accordance with routing rules determined in dependence on such link performance measures, and to the use of such link performance measures in relation to determining measures indicative of expected quality of experience in respect of data traversing end-to-end paths across a network.

BACKGROUND TO THE INVENTION AND PRIOR ART

There are various scenarios in which the end-to-end performance of services delivered across a network may be important, and various ways in which good or poor end-to-end performance may manifest itself and be monitored or perceived by end-users. Various factors may affect end-to-end performance, including the performance of an end-user's own local network or a computing device therein, but unsatisfactory end-to-end performance in respect of a service is often caused by links on the route that carries the service across a network, the choice of which is generally not under the control of the end-user.

If the links making up a route currently being used for a service cannot sustain the service-level agreement (SLA) of the service, end-users of the service are likely to perceive that they have experienced poor performance. Poor performance can manifest itself, for example, as drop-outs in a video service, as poor voice-quality in a Voice-over-. Internet Protocol (VoIP) call, as slow response behaviour in an application running on a remote server, etc. Measuring the SLA parameters (e.g. delay, jitter, packet loss etc.) of a service may not be sufficient to get a good idea about the end-to-end performance. For example, video content with rapid scene changes generally requires a higher bit-rate to achieve the same quality of perception as video content with little movement. Therefore, small fluctuations in Quality of Service (QoS) may not be noticeable to end-users in terms of Quality of Experience (QoE), meaning that a service could still continue on a route that occasionally shows degraded performance. In some scenarios, SLA parameters may be too lenient for good QoE, possibly having been selected mainly out of cost considerations. Real-time collection of per-link performance metrics from the network might be a challenge. In other scenarios, many services may be transmitted over one link, the theoretical link capacity of which should be able to sustain all of the services, but fluctuating data rates may result in them competing with each other for capacity at certain times, leading to a poor end-to-end performance for some or all of them.

One or more links on a route may thus be insufficient for delivering good end-to-end performance of a service. In some scenarios, a network operator may have access to network performance metrics per link in real-time, and may use these, but such real-time "per link" network performance metrics are not always available, and even if they are, they might be spurious or poorly understood.

If routing is done according to standard protocols based simply on minimising hop-count, it may not be possible to pick links that can guarantee an SLA.

A paper entitled "QoE Content Distribution Network for Cloud Architecture" by Hai Anh Tran, Abdelhamid Mellouk and Said Hoceini (First International Symposium on Network Cloud Computing and Applications (NCCA), November 2011) relates to "cloud" services and their increasing use in the provision of network services. Due to the high bandwidth requirements of cloud services, use may be made of Content Distribution Networks (CDNs), which may support high request volume and improve network quality using a mechanism based on replication of information among multiple servers. The paper proposes a Content Distribution Network Cloud Architecture, which based not just on Quality of Service criteria (such as round trip time, network hops, loss rate, etc.) but also on the Quality of Experience that represents end-users perception and satisfaction. It describes how QoE scores may be used in combination with QoS parameters to compute a link score or link cost that can be used in a routing function, describing how QoE values can be sent back along the route data packets have travelled and how link scores may be updates via a known method called "Q-Learning".

Past techniques for predicting link failures and link QoS degradation have generally required real-time link performance metrics, such as those from a Management Information Base (MIB) of routers, to determine these weak links.

International application WO 2012/085498 relates to communications network management, and in particular to a communications network which is divided into a plurality of segments, each segment comprising one or more routers and one or more communications links that connect the routers. QoS thresholds can be defined for each of the segments, and if it is predicted that one of these thresholds is to be breached in one of the segments, for example due to a communications link or a router being overloaded, then a segment management module associated with that segment can re-route the traffic.

International application WO 2012/085519 also relates to communications network management and to a communications network which is divided into a plurality of segments, each segment comprising one or more routers and one or more communications links that connect the routers. In this, each segment also comprises a segment management module. Each of the segment management modules reports to a supervisory management module (of which the network may have more than one). If a segment management module predicts that a QoS threshold will be breached, it may re-route a data flow within that segment. If such a re-route is not possible, a request may be sent to the appropriate supervisory management module to initiate a re-routing to a further segment.

International application WO 2011/117570498 relates to a technique for network routing adaptation based on failure prediction, and in particular to a system that predicts network events and triggers a pre-emptive response, and aims to predict network link failures and create a change in the network before the failure actually happens by instigating policy-based adjustment of routing parameters. An example implementation operates in two phases. In the first phase, the historical operation of a network is observed, to determine observed relationships between link or cluster failures that have occurred, and subsequent failures of different links or clusters. From these observed relationships, failure rules can be derived that are then applied to control routing in the network during a control phase. In this, the derived failure rules are applied such that if a link or cluster failure occurs, then from the rules a prior knowledge of what additional links may fail in the next time period is obtained, and remedial action can be taken such as routing data traffic away from the links that are predicted to fail.

In relation to techniques such as the above that predict link failures and link QoS degradation, such that traffic can be re-routed around underperforming link or such that session admission decisions can be made, it has generally been assumed that MIB parameters are available in real-time to the decision-making unit. Such parameters may not be available, however, or may be difficult to obtain and/or keep "concurrent" (i.e. updated appropriately by all instances). For instance, reported metrics can be out-of-date and/or not synchronised with reports from neighbouring routers (due to possible randomness in report generation as well as lags in polling or delays/errors incurred in the network while transmitting such traps to the decision-making unit). It might also generate management traffic loads from all intermediate routers that the operator might find undesirable.

Referring to other citations, United States patent application US2008/080376 ("Adhikari") relates to techniques for determining locations or other causes associated with performance problems or other conditions in a network, which may be used in network monitoring and analysis systems for the monitoring and analysis of Voice over Internet Protocol (VoIP) communications, multimedia communications or other types of network traffic.

US2006/274760 ("Loher") relates to techniques for monitoring packet quality over an IP-based network by identifying sets of nodes and deriving the existence of the links between these nodes. The combination of these nodes and links logically make up network paths. Quality measurements performed across the network path can then be attributed to links, nodes, routes, networks, and other components of a communication network.

Japanese patent application JP2007221424 ("NEC") relates to techniques for measuring communication quality in which end-to-end performances are measured on a number of routes and the minimum value of these is attributed to a link shared by the paths.

SUMMARY OF THE INVENTION

The present inventors have realised that issues such as those set out above may be dealt with using a different approach that is not reliant on information such as MIB parameters being available in real-time to a decision-making unit, and which is not reliant on link performance metrics being available from intermediate nodes on a multi-link path.

According to a first aspect of the present invention, there is provided a method of deriving or updating routing rules in dependence on which routing decisions may be implemented by data-forwarding nodes in a data communication network, the data communication network comprising a plurality of data-forwarding nodes each capable of forwarding data along a plurality of communication links, the method comprising receiving end-to-end path performance measures in respect of a plurality of end-to-end paths across the network, the end-to-end paths each comprising a plurality of links which together form a path for data to traverse the network from a data-sending network-node to a data-receiving network-node, the or each end-to-end path performance measure in respect of a particular end-to-end path being dependent on and indicative of a network performance metric observed at the data-sending network node of that end-to-end path or at the data-receiving network-node of that end-to-end path;

determining, in dependence on end-to-end path performance measures received in respect of a plurality of end-to-end paths having at least one link, in common, and on the basis of route information identifying the links of which those end-to-end paths are comprised, one or more link performance measures, the or each link performance measure relating to a link of which at least one of those end-to-end paths is comprised; and deriving or updating routing rules in dependence on the one or more link performance measures so-determined.

According to preferred embodiments, the route information may be obtained from a route information database. Alternatively or additionally, the route information may be obtained from data units that are intended to traverse, are traversing, or have traversed a path across the network.

According to preferred embodiments, the step of receiving end-to-end path performance measures may comprise receiving end-to-end path performance measures from one or more data-sending network nodes and/or from one or more data-receiving network-nodes.

According to preferred embodiments, the received end-to-end path performance measures may comprise objective performance measures made in respect of characteristics indicative of network performance on the end-to-end path. Alternatively or additionally, the received end-to-end path performance measures may comprise subjective performance measures made in respect of characteristics indicative of network performance on the end-to-end path.

According to preferred embodiments, the data traversing the network may have one of a plurality of categories associated therewith, and the step of determining one or more link performance measures may comprise identifying end-to-end path performance measures received in respect of data of one or more categories that is traversing the network, and determining, in dependence on end-to-end path performance measures received in respect of data of said one or more categories traversing a plurality of end-to-end paths having at least one link in common, and on the basis of route information identifying the links of which those end-to-end paths are comprised, one or more category-specific link performance measures, the or each category-specific link performance measure relating to performance in respect of said one or more categories of a link of which at least one of those end-to-end paths is comprised.

In such embodiments, the categories with which data traversing the network are associated may include one or more categories such as class of service, type of service, or others.

According to preferred embodiments, the data-forwarding nodes are nodes such as routers, capable of implementing routing decisions whereby to forward data units via any of a plurality of links. Such routing decisions may be made by processors at the nodes themselves according to predetermined rules, based on information received about the performance of the network and/or of links and other nodes, for example, or may be made by one or more other entities and communicated to the nodes in order to be implemented by them.

Methods according to preferred embodiments do not require real-time link performance metrics, such as those from the Management Information Base (MIB) of routers.

Methods according to preferred embodiments may be used by network operators for example, who may use them to identify poorly performing links in a network, for example. This may be done reactively and/or predictively, with traffic being re-routed around links found to have performed or be performing poorly, or around links predicted to perform poorly (in the future generally, or at specific times of day, for example).

Methods according to preferred embodiments may be used for the identification of one or more links having a link performance measure indicative of performance below a predetermined threshold, in which case routing rules may then be updated allowing routing decisions to be taken such as to route data along other links, rather than those deemed to be poorly-performing or "weak" links. Alternative embodiments may be used for the identification of one or more links, having a link performance measure indicative of performance above a predetermined threshold, in which case routing rules may then be updated allowing routing decisions to be taken such as to route data along those deemed to be high-performing or "strong" links, rather than other links.

Methods according to preferred embodiments may determine link performance measures based on end-to-end route performance measures such as perception scores, which may also be used to determine measures of overall quality of experience. Where the end-to-end path is from a data-sending server to a data-receiving client, such end-to-end perception scores may be received from the client-side. Where the data is video content, for example, end-to-end perception scores indicative of user-rated perceived video quality may be used. By mapping the various routes used by services on top of each other, weak links may be determined.

Using such techniques, the data that is required and the load on the network due to management traffic may be greatly reduced.

Such techniques may be applicable in scenarios where real-time performance metrics may be inaccessible for constant retrieval but can be collected in batches (say, overnight) instead. In such scenarios, prior art techniques may be inapplicable as they may require access to link performance metrics to make real-time routing decisions.

Methods according to preferred embodiments may be used to identify links that are responsible for poor end-to-end QoE without directly measuring individual link performance and relating it to an end-to-end performance measure.

A network management system using techniques such as the above may identify weak links over time that are responsible for poor end-to-end service performance and ensure that they are less likely to be selected or are not selected for routes in the future. This can lead to route choices that better support a desired end-to-end service performance level.

By virtue of such a routing rule method, link performance measures determined using methods according to the first aspect may be used to derive or update routing rules in dependence on which routing decisions may be implemented by data-forwarding nodes in a network. The routing rules may be for use by processors at the nodes themselves, for example, or may be for use by one or more other entities, with routing decisions made using those rules being communicated to the nodes in order to be implemented by them.

According to a second aspect, there is provided a method of forwarding data, the method comprising deriving or updating one or more routing rules using a method according to the first aspect, then forwarding data in accordance with said one or more routing rules.

According to a third aspect, there is provided a method of determining a measure indicative of expected quality of experience in respect of data traversing a particular end-to-end path across a network, the particular end-to-end path comprising a plurality of communication links which together form a path via which data may traverse the network from a data-sending network-node to a data-receiving network-node, the method comprising, in respect of each of a plurality of links of which said particular end-to-end path is comprised, determining a link performance measure by:

receiving end-to-end path performance measures in respect of a plurality of monitored end-to-end paths across the network, the monitored end-to-end paths each comprising a plurality of links which together form a path for data to traverse the network from a data-sending network-node to a data-receiving network-node, the respective end-to-end path performance measures in respect of each monitored end-to-end path being dependent on and indicative of a network performance metric observed at the data-sending network node of that end-to-end path or at the data-receiving network-node of that end-to-end path; and determining, in dependence on end-to-end path performance measures received in respect of a plurality of monitored end-to-end paths having at least one link in common, and on the basis of route information identifying the links of which those end-to-end paths are comprised, one or more link performance measures, the or each link performance measure relating to a link of which at least one of those end-to-end paths is comprised;

then determining a measure indicative of expected quality of experience in respect of data traversing said particular end-to-end path in dependence on the respective link performance measures determined in respect of the plurality of monitored end-to-end paths.

By virtue of such a method, link performance measures determined using methods according to the first aspect may be used to determine measures indicative of expected quality of experience in respect of data traversing an end-to-end path across a network. Such measures indicative of expected quality of experience may themselves be used to make routing decisions, for example.

According to a fourth aspect, there is provided apparatus for deriving or updating routing rules in dependence on which routing decisions may be implemented by data-forwarding nodes in a data communication network, the data communication network comprising a plurality of data-forwarding nodes each capable of forwarding data along a plurality of communication links, the apparatus comprising:

a receiver arranged to receive end-to-end path performance measures in respect of a plurality of end-to-end paths across the network, the end-to-end paths each comprising a plurality of links which together form a path for data to traverse the network from a data-sending network-node to a data-receiving network-node, the or each end-to-end path performance measure in respect of a particular end-to-end path being dependent on and indicative of a network performance metric observed at the data-sending network node of that end-to-end path or at the data-receiving network-node of that end-to-end path; and a processing module operable to perform steps of:

determining, in dependence on end-to-end path performance measures received in respect of a plurality of end-to-end paths having at least one link in common, and on the basis of route information identifying the links of which those end-to-end paths are comprised, one or more link performance measures, the or each link performance measure relating to a link of which at least one of those end-to-end paths is comprised; and deriving or updating routing rules in dependence on the one or more link performance measures so-determined.

The various options and preferred embodiments referred to above in relation to the first aspect are also applicable in relation to the second, third and fourth aspects.

BRIEF DESCRIPTION OF THE DRAWINGS

A preferred embodiment of the present invention will now be described with reference to the appended drawings, in which.

DESCRIPTION OF PREFERRED EMBODIMENTS OF THE INVENTION

With reference to the accompanying figures, methods and apparatus for determining and using link performance measures according to preferred embodiments will be described.

Figure 1:
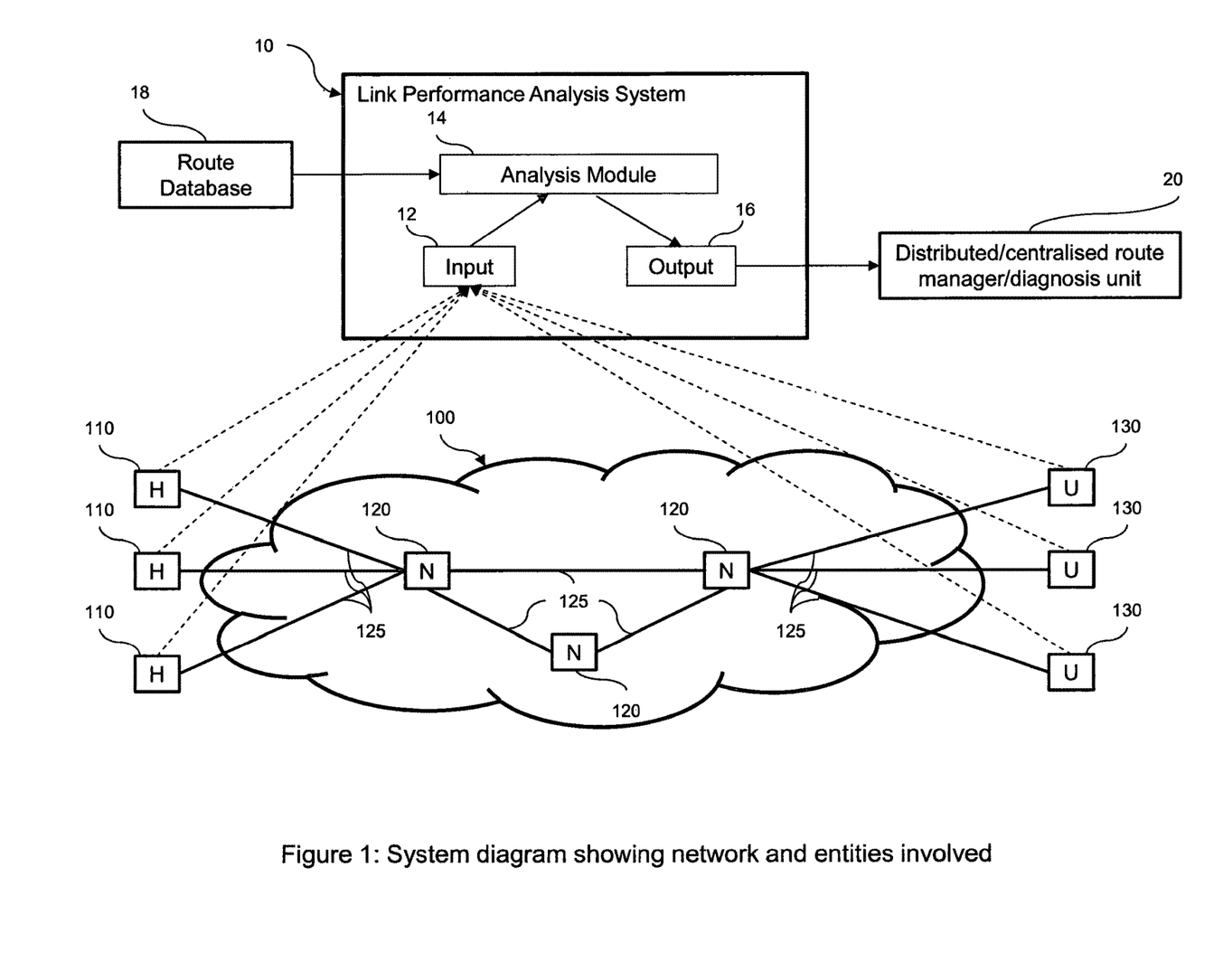
FIG. 1 is a system diagram illustrating the principal types of entities which may be involved in performing route analysis according to embodiments of the invention.

FIG. 1 is a system diagram illustrating the principal types of entities which may be involved in performing route analysis according to a preferred embodiment. It shows a network 100, which may be the Internet, a core network, or a part thereof, for example. It shows three service hosts 110 (each labelled "H"), which are connected to (and are thus able to send data to and/or receive data from) three end-user clients 130 (each labelled "U") via the network 100. The network 100 is shown as having three intermediate forwarding nodes or routers 120 (each labelled "N") connected by network links 125.

Figure 2:
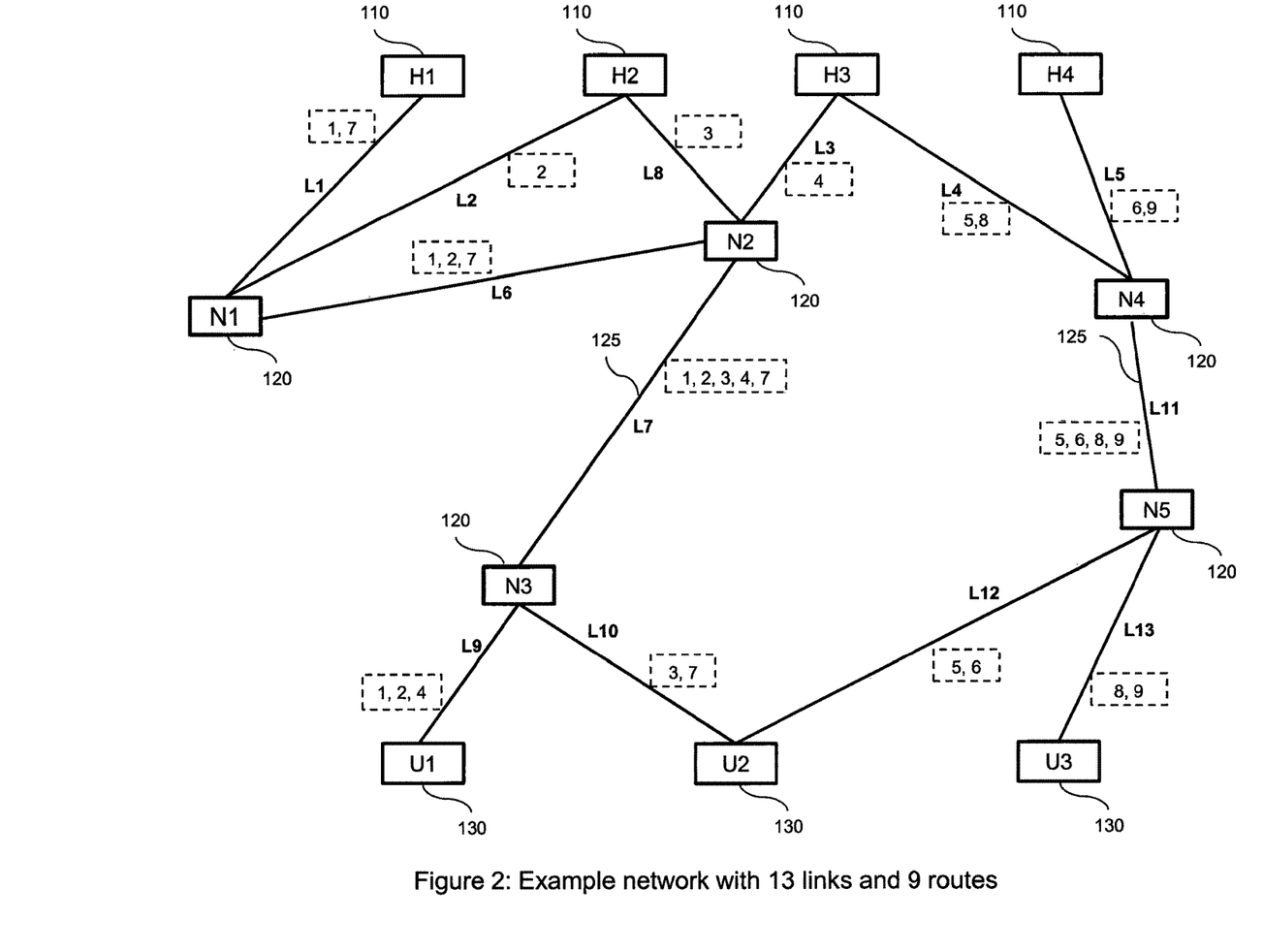
FIG. 2 shows an example network with thirteen links and nine routes.

Only a few service hosts 110 and end-user clients 130 are shown in FIG. 1, and for simplicity the network 100 is shown with only a few forwarding nodes or routers 120 and a few links 125. FIG. 2, which will be discussed in more detail later, illustrates how even with only a few entities involved, there may be several routes for the provision of networked services by hosts to clients, and that these routes may share some or all of the links of which they are comprised with other routes. It will be understood that the aim of FIG. 1 is mainly to indicate the types of entities which may be involved, and that a core network would in general have many more routers and links that are shown in FIGS. 1 and 2. It would in general be capable of facilitating data communication between much greater numbers of network nodes (such as service hosts 110, end-user clients 130, and others) along a much greater number of possible paths between data senders and data receivers. It will also be appreciated that the characterisation of entities as service hosts 110 sending data or end-user clients 130 receiving data is purely for simplicity—the entities which communicate via such a network may simply be service providers or service users, and may simply be senders of data or receivers of data, but they may fulfil more than one such role. Whether the entities communicating via a network are(primarily) acting as senders of data or receivers of data, or are performing both functions, the edge nodes 110,130 via which they are connected to the core network 100 may be referred to generally as end-user network nodes.

FIG. 1 also shows a link performance analysis system 10. This has an input 12, an analysis module 14 and an output 16. The input is in communication (via the network 100, via another network, or otherwise—possible communication lines are indicated by dotted lines) with some or all of the end-user network nodes 110,130, and is thereby able to receive information from them, including path performance measures (as will be discussed in more detail later). In some embodiments, it may receive path performance measures only from data-receiving end-user network nodes (such as end-user clients 130), while in others, it may receive path performance measures only from data-sending end-user network nodes (such as service hosts 110), but in general, it may receive path performance measures from data-receiving and data-sending end-user network nodes.

As will be discussed in more detail later, path performance measures received at the input 12 of the link performance analysis system 10 are passed to an analysis module 14, which has access to a route database 18. The route database 18 may be a part of the link performance analysis system 10, or it may be an external database with which the analysis module 14 of the link performance analysis system 10 may communicate (via the network 100, via another network, or otherwise). It is able to provide route information in respect of particular end-to-end paths between particular data-sending and data-receiving end-user network nodes, and/or in respect of particular network services provided by particular data-sending nodes to particular data-receiving nodes, the route information identifying the links of which those end-to-end paths are comprised. The route information in the route database may be updated in response to information received about faults, link performance, topology changes, and other factors which may affect the route that data may take across the network.

It will be noted that in alternative embodiments, such route information need not be provided from a single dedicated route database. Depending on the entities concerned, the type of data being exchanged, the communication protocols being used and other factors, the route information may instead be obtained from a distributed route database, from network nodes (possibly via Link State Advertisement (LSA) or other messages), from data units that are intended to traverse, are traversing, or have traversed a path across the network 100, or in other ways. Such information may thus be provided to the system 10 by the data units in question or others, or by network nodes that have sent, forwarded or received data units, the route information being provided directly or via one or more route databases, for example.

The analysis module 14 is arranged to process the received path performance measures together with route information, and to determine, in dependence on path performance measures received in respect of end-to-end paths having at least one link in common together with route information identifying the links of which those end-to-end paths are comprised, link performance measures, the link performance measures relating to links of which those end-to-end paths are comprised.

Link performance measures determined by the analysis unit 14 are then provided to an output 16 of the link performance analysis system 10, which may provide them to a unit 20 such as a route manager, to allow the link performance measures to be taken into account in further routing decisions, and/or to a diagnosis unit for further diagnostic analysis. The route manager and/or diagnosis unit 20 may be a part of the system 10, or may be separate, and may be distributed or centralised.

In embodiments in which link performance measures determined by the system 10 are to be taken into account in further routing decisions, information concerning the link performance measures, updated routing tables or routing decisions may need to be provided to network nodes such as data-sending network nodes (service hosts 110, for example), intermediate network nodes (forwarding nodes or routers 120, for example) or other network entities such as nodes holding routing databases. Connectivity back into the network for such purposes is not shown in FIG. 1 in order to avoid this becoming unnecessarily cluttered, but it will be understood that there are several possible options for doing this.

Diagnostic Usage

For the purposes of describing a preferred embodiment, we will consider a scenario in which a network (which in general would have many more nodes than network 100 as shown in FIG. 1) carries a multitude of end-to-end services. These services can include video streams, VOIP calls, interactive applications, multiplayer games, etc.

Intelligent analysis in respect of path performance measures received in respect of the passage of data units across the network is performed by a link performance analysis system 10, which will generally be referred to as a route analyser 10. According to this embodiment, the primary measure that is computed by the route analyser 10 in respect of each of a plurality of links in the network order to identify weak links is a link performance measure $D_L$. This is a diagnostic measure for a given link L, which in this example will be taken to be in a range from 0 to 1. A $D_L$ value of 1 means that the given link is only part of routes that currently have optimal end-to-end performance (or performance above a threshold regarded as "good" or "acceptable", for example). A $D_L$ value of 0 means that the link is part of one or more routes that are suffering from poor end-to-end performance.

As will be apparent, link performance measures so-determined may be provided to data senders and/or to routers and other network nodes responsible for forwarding data, to a unit such as a route manager which may use them in order to determine how to route or re-route data (communicating its decisions to senders and forwarding nodes as applicable), and/or to a diagnosis unit for further analysis, for example. As will be explained in more detail later, link performance measures determined according to some embodiments may be used predictively, rather than for immediate or direct use in routing or re-routing, however.

Computation of $D_L$ Values for Links in a Network

Briefly, $D_L$ may be calculated in the following manner, a detailed process for which will be described later with reference to FIG. 3.

According to the present embodiment, two types of input are used by route analyser 10 to compute $D_L$ for the links in the network:

1) A first type of input indicating, in respect of particular end-to-end paths, the quality of experience observed by an end-user in respect of data travelling to or from them via the path in question; and 2) A second type of input indicating, in respect of particular end-to-end paths, individual links making up the route taken, being taken, or to be taken across the network from a particular ingress point to a particular egress point by data forming part of a particular flow or service.

In this example, inputs of the first type are computed or otherwise determined on the client side, and indicate a measure of the overall quality of experience from the point of view of data-receiving end-user clients 130. This measure can be purely objective, or can take into account subjective factors that reflect the perception of the end-user. Measures can be, for example, subjective quality of perception for video streams, pixilation of videos, number of dropped frames in the content per time interval, voice quality of VOIP calls, and application performance like end-to-end response time. Note that these are all examples of end-to-end performance measures, subjective or otherwise. Purely subjective measures can be, for example, user feedback on a scale of 1 to 10, 1 meaning poor and 10 meaning excellent.

It will be appreciated that the end-to-end performance measures may be determined or computed in a variety of different ways. In this example, however the measure is obtained, it will be assumed that it provides a number which can be normalised such that 0 represents poor (or otherwise unacceptable) performance and 1 represents excellent (or otherwise acceptable) performance. This end-to-end quality measure will henceforth be referred to as $E_{S,U}$ for a given service S, reported by an end-user client U that consumes this service.

The clients 130 regularly or frequently report their $E_{S,U}$ measure or measures to the route analyser 10. They may communicate directly with the route analyser.

It will be understood that in alternative embodiments, the $E_{S,U}$ measures may reflect performance from the point of view of the service hosts 110 as well as or instead of performance from the point of view of the clients 130. If it is desired that the measure should take into account performance from the point of view of service hosts 110 and clients 130, to make the measure dependent on parameters observed by both, both may communicate directly with the route analyser 10. Alternatively, for example, the clients 130 may feed their data back to the service hosts 110, who may include their data into a combined measure before providing this to the route analyser 10. This may allow service hosts providing a service to multiple clients to determine a performance measure in respect of multiple clients. The service host may combine the values received from clients on a "per client" and/or on a "per time period" basis. A suitable summarisation would be, for example, to compute averages per client every 5 minutes and to store the averages for a moving 24 hour time window. The reporting entity, be it the service hosts or the clients, would in general decide upon an aggregation method and reporting interval. For example, reporting of an average or minimum $E_{S,U}$ could be done at the end of a service to characterise the performance for the duration of the service.

In the following, for simplicity, we consider the situation where the end-to-end performance values are determined by service hosts 110 (which may be with or without information received from their clients 130), who provide the $E_{S,U}$ values to the route analyser 10.

The route analyser 10 maintains a table with the following information, based on information received from service hosts H1, H2 and H3:

TABLE 1

Table $T_{E-2-E}$ of end-to-end performance values maintained by a service host

| Service host | Application Type | Class of Service | End-User Client | Time | $E_{S, U}$ |
|---|---|---|---|---|---|
| H1 | Video stream | EF | U1 | 23/11/2012 10.55 | 0.67 |
| H1 | Video stream | EF | U1 | 23/11/2012 11.00 | 0.56 |
| H2 | Database Access | AF | U2 | 23/11/2012 08.00 | 0.98 |
| H3 | Video stream | EF | U3 | 23/11/2012 08.00 | 0.34 |
| ... | ... | | ... | ... | ... |

For the second type of input, the route analyser 10 receives the hop-by-hop route of the service S in question within the network from the ingress point to the egress point. This can be obtained in a number of ways, depending on the protocol stack used by the application. For example, it can be obtained from resource reservation protocols such as RSVP. In a network that operates a link-state protocol such as OSPF, the end-to-end route within the network can be obtained from the protocol itself as it supports a topology map of the network and associated link costs. Alternatively, if fixed MPLS tunnels have been configured, these routes can be known in advance. If multicast traffic traverses this network, routing information for the multicast trees can be obtained from the respective routers' Tree Information Base (TIB). We refer to route information for a given service S to a particular end-user client U as $R_{S,U}$.

$E_{S,U}$ and $R_{S,U}$ data is consumed by the route analyser 10. This entity can rest anywhere in the network including at ingress routers, at service hosts or as a dedicated unit. The route analyser 10 can correlate the $T_{E-2-E}$ tables with the route information for the services shown in the table to compute average $E_{S,U}$ values per route. Alternatively, average $E_{S,U}$ values can be computed per route (i.e. for each Service Host: End-User Client combination), per class of service/type of service/time of day, or sub-combinations thereof.

In this example, $D_L$ is computed as follows. If a link is part of a route, it is assigned the $E_{S,U}$ value reported for this route. If the link is part of only one route, this becomes its $D_L$ value. If the link is part of more than one route, its $D_L$ value is the average of the $E_{S,U}$ scores of all of these routes. For example, if link L. is part of three different routes, the services on which have $E_{S,U}$ values of 0.3, 0.7 and 0.8 respectively, the $D_L$ value for link L is 0.6. Links in respect of which no $E_{S,U}$ value or route information is known may have their $D_L$ value initialised to 1.0 by default. Evidently this is a trusting approach where links are not negatively impacted if there is no information about them. Alternative approaches are also possible where, for example, an average or pre-determined $D_L$ value is assigned if no information is available from the link L. $D_L$ values can also be grouped by application type or Class of Service ("CoS"), resulting in a vector of $D_L$ values per link. The average calculated over the number of routes supported by L can be computed as a weighted average to differentiate in importance between the routes and the services they support. The route $E_{S,U}$ value can also be weighted by the number of clients consuming the service(s) on this route. Additionally, the update of a $D_L$ value can be done as a smoothed average over time, combining new information with the old average, to avoid rapid changes.

The $D_L$ values may be updated periodically, e.g. every 5 minutes, to reflect changes in end-to-end performance of routes. If a link is no longer part of any routes, information about it may not be reported by any clients. In view of this, $D_L$ values may be "aged" appropriately. This may ensure that links that are not used slowly return to $D_L$=1.0 again to avoid being penalised (or to an average value, or to some other default value, as explained above).

It will be noted that a network may support various classes of service. In such scenarios, it may be appropriate to incorporate information about these into the computation of $D_L$ in different ways, either to produce individual $D_L$ values for the different classes, or to produce combined $D_L$ values reflecting the overall performance of links for the data of the various classes they are carrying. As mentioned above, it would be possible to have a vector of $D_L$ values for the multiple classes of service. Using the score for routing purposes (as will be discussed later) then means that the network may also have an awareness of available traffic bandwidth in each class of service on a link L to avoid sending a high bandwidth of traffic through the link based on a high $D_L$ value which might result in a see-saw effect of decreasing the $D_L$ value due to subsequent congestion. This approach results in a separate link model across the network being developed for each class of service. Whilst the granularity of this approach is an advantage, this approach can be quite complex. Alternatively, one other possible implementation is to combine the vector of $D_L$ values into a single value by giving weighting factors to each of the classes of service and using this to compute a single $D_L$ value. Factors to take into account in assigning these weighting factors for link L could include: bandwidth availability for the CoS in the link L (related to queue management policies in its associated routers) and importance of that particular CoS to the operator. For example, EF/AF traffic (i.e. "Expedited Forwarding" and "Assured Forwarding") could be considered to be more important than DE traffic ("Default").

A more detailed description of how $D_L$ values may be determined will now be given with reference to FIG. 3. It will be noted that while this is a possible method to compute $D_L$ values, this method can be replaced by a variety of others, subject to the necessary network knowledge being available. It will also be noted that other types of link performance measures may be determined instead. A detailed description of how another such type of link performance measure may be determined will be given later with reference to FIG. 4.

Figure 3:
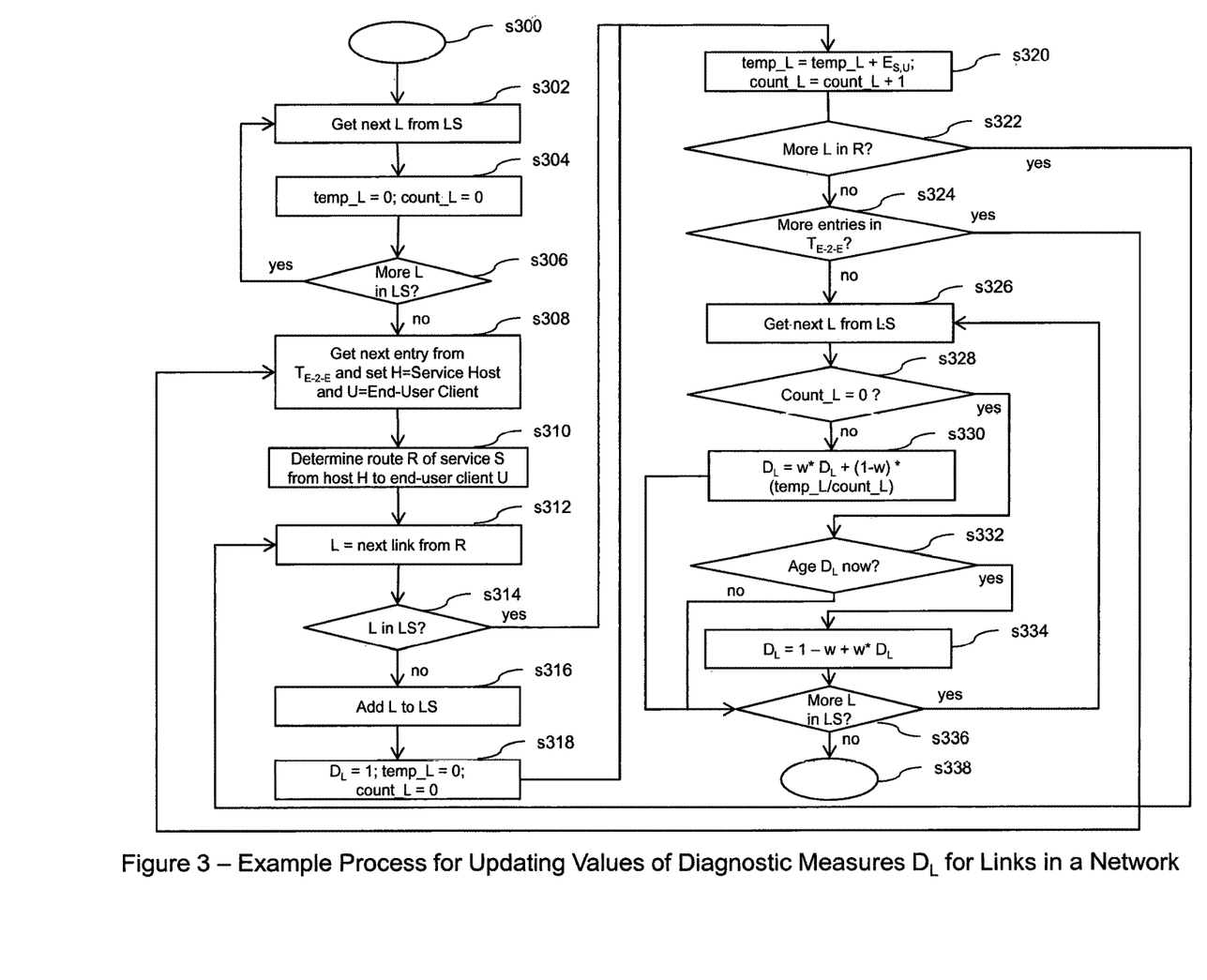
FIG. 3 is a flow-chart illustrating an example process for updating values of diagnostic measures for links in a network.

Referring to FIG. 3, an algorithm to update the $D_L$ values for all links may be invoked periodically by the route analyser 10 to update $D_L$ values in respect of some or all of the links 125 in the network 100. It begins in step s300 and first runs a loop (s302-s306) where counters temp_L and count_L are initialised to zero (s304) for each link L in the current link set LS. The route analyser maintains a link set LS where it stores all links it has encountered in any route and their respective $D_L$ values. If the link set LS has been exhausted in s306 the algorithm continues with two nested loops s308-s324. The outer loop s308-s324 runs over all entries in the table $T_{E-2-E}$. The inner loop s312-s322 runs over all links L in a particular route R. In s308 the route analyser retrieves the next entry from $T_{E-2-E}$ and identifies service host H and end-user client U in respect thereof. In s310 the route R from H to U is determined based on information from the route database. The route R consists of a list of links, and the inner loop s312-s322 involves running through all links in the route to add up the scores from the $T_{E-2-E}$ table and to count the number of services in which a link is used. In s314 it is established if the link is already contained in the current link set LS. If a link has not been seen by the route analyser, it gets a default $D_L$ value of 1, the link is added to the link set LS in s316, and counters temp_L and count_L are initialised to zero (s318). Otherwise the process continues directly with s320. In s320 the $E_{S,U}$ score is added to the current sum for L in temp_L and increase L's service counter is increased by 1. The process continues with the inner loop from s312 if the test in s322 reveals more links in the route R, otherwise it is checked in s324 if there are more unprocessed entries in $T_{E-2-E}$. If so the process continues with the outer loop from s308, otherwise it continues with s326. From s326, another loop s326-s336 starts in which the new $D_L$ values are computed for each link in the link set LS. The route analyser takes the next link from the link set LS in s326 and checks in s328 if the service counter is zero (to avoid divisions by zero). If the counter is not zero, $D_L$ is computed according to the formula in s330 which is a weighted average of the old $D_L$ value and the new average score temp_L/count_L. A weight "w" between 0 and 1 is used here. For example, setting w=0.9 means that 90% of the current $D_L$ are maintained, but this can be chosen in the light of how strongly current values are to be taken into account in comparison with recent or older values. In the example described earlier, a weight w=0.5 is used. If the counter is zero then $D_L$ is not recomputed and it is checked in s332 if the $D_L$ value should be aged. This decision can be based on some timer that provides information relating to the intervals over which $D_L$ values should return to 1 for a link which is no longer part of any route (e.g. every hour, every 24 hours, etc.). If the decision is made to age the $D_L$ value, the formula in s334 is applied using the same weight w. Otherwise the process jumps to the end of the loop s336, where it is tested if more links are present in the link set LS and have to be processed. If there are more links left, the process continues with the loop from s328, otherwise the process for performing the algorithm completes at s338.

Exemplary pseudo-code which may be invoked periodically by a route analyser 10 according to an embodiment in order to update all $D_L$ values in the network using a process such as that described above and shown in FIG. 3 could be as follows:

```
For each L in LS
    temp_L = 0; count_L = 0;
End
For each entry in T_E-2-E
    H = Service Host; U = End-User Client
    R = route(S,U)
    For each L in R
        If not(L in LS)
            then add L to LS; D_L = 1; temp_L = 0; count_L = 0;
        end
        temp_L = temp_L + E_S,U;
        count_L = count_L + 1;
    end
End
For each L in LS
    if count_L == 0
        then if time_to_age
            then D_L = 1 - w + w* D_L  /* age D_L
                if it is not in any route */
        end
        else D_L = D_L * w + (1-w) /* (temp_L/count_L); /*
            update D_L */
    End
End
```

Use of $D_1$ Values $D_L$ values determined as set out above or using processes according to other embodiments may be used simply to diagnose "weak" links in the network. This may be achieved in the absence of real-time network performance metrics (from the MIB, for example). A low $D_L$ value for a link L may indicate that the link is part of one or more underperforming routes, whereas a high $D_L$ value may indicate that the link is part of one or more routes that support services with good QoE. Using an appropriate threshold, links with a consistently low $D_L$ value can be highlighted to an operator for investigation and troubleshooting.

$D_L$ values may also be used as a trigger or basis for re-routing. This may be achieved in real-time, the $D_L$ values being used by the route analyser 10 or another entity to trigger re-routing around weak links. The method of pushing the routing changes back to the routing entities (to distributed routing daemons running on each of the routers, or to a centralised entity that handles local routing, for example) will not be discussed in detail here, as well-known techniques may be used. Generally, however, a mechanism of communication would exist between the route analyser 10 and the forwarding plane where packet switching takes place. Methods of achieving this include using Telnet, or using an API that interfaces between the network and the intelligence unit.

Routing traffic away from an underperforming link may allow it the chance to recover, should congestion be the cause of poor performance. Eventually, while not being used, the $D_L$ value of a link may increase, after which it may be autonomously reused in routing.

The following is an example of how $D_L$ values can be used in conjunction with existing routing protocols.

A simple way to turn a $D_L$ value into a link cost value (where $D_L$ values are in a range from 0 to 1) is to compute 1-$D_L$, in accordance with routing protocols that are configured to prefer lower link costs over higher ones. This can either be used on its own or combined with the existing routing metric. This can be done by weighting the $D_L$ value in relation to the unicast (or multicast) routing cost and adding it to the existing cost metric. The weight applied to the two costs depends on the importance that the operator wishes to apportion to each of the two components.

From the above, three possible applications of $D_L$ are evident: 1) determination of weak links for the operator; 2) reactive re-routing around weak links based on $D_L$ values; and 3) proactive usage of $D_L$ to influence routing algorithms for subsequent routes.

As mentioned earlier, types of link performance measure other than $D_L$ may be determined. A technique in respect of one such measure, a cost measure $C_L$, will now be described.

Computation of $C_L$ Values for Links in a Network

We now describe an alternative measure that can be computed instead of $D_L$. We call this $C_L$ and it is a cost value that reflects the number of times a given link L is part of poorly performing routes. This is different to $D_L$ since the latter is a function of perceived end-to-end performance, whereas $C_L$ is a function of the number of times a link is part of any route perceived as being an underperforming route (thus not needing to take into account the extent of the poor performance). The $C_L$ value of a link L essentially reflects the number of occasions that the link is common to two or more underperforming routes.

Briefly, $C_L$ may be calculated in the following manner, a detailed process for which will be described later with reference to FIG. 4. The route analyser 10 first sorts the routes into high-performing and low-performing routes based on $E_{S,U}$ values. The route analyser 10 maintains a list of poorly performing routes (as determined from the $E_{S,U}$ value) and removes routes from this list if they are no longer in use or if their $E_{S,U}$ values subsequently increase. Using the hop-by-hop route information described earlier, it identifies common links in this list of poorly performing routes. It can do this by computing the length "le" of a route and adding a value of 1/le to the $C_L$ value of a link L. Length le is the number of hops the route contains from one client to another. The $C_L$ value is a penalty measure for poor performance of a route and by apportioning it equally to each component link in the route, the penalty can be distributed evenly. This is because knowledge that an end-to-end route is exhibiting poor performance may not allow a determination as to which of its component links may be responsible for the overall poor performance. This procedure may be performed for all links and all the routes in the network segment. Therefore, if a link is a common link of several poorly performing routes, its link cost $C_L$ increases through this procedure (as will be described with reference to FIG. 4) with each addition weighted by the length of the route that contributes to that increase. If a link is shared by many poorly performing routes, its $C_L$ value will be higher than that of other links.

If information about network congestion is known, this can also be used to increment $C_L$ values accordingly by incrementing $C_L$ by a value related to congestion instead of 1/le.

$C_L$ values are initialised to a default value, which could be set depending upon the class of service that this $C_L$ value is computed for, so that links can be differentiated when used in routing algorithms per class of service.

The route analyser may age $C_L$ values and decrease them over time such that link costs return to their default values if links are no longer used or no longer appear as a common link in low performing routes.

It will be understood that there could be a higher number of levels into which route performance may be classified, such as "high", "medium" and "low", of course. Similarly, a three-tier classification system for the performance of individual links may be used. In such a case, the network could continue using the component links classified to be of "medium" performance under certain (less congested) network conditions, for example. Alternatively, a link that is part of a "medium" performing route may be penalised by a different value added to its $C_L$ factor. Such a system can be expanded, each tier of classification being treated differently and contributing differently to the cumulative $C_L$ value for link L, for example.

A process for determining $C_L$ values (in a case where the end-to-end quality measure $E_{S,U}$ classifies route performance according to two levels, indicating end-to-end performance above or below a predetermined threshold) will now be described with reference to FIG. 4.

Figure 4:
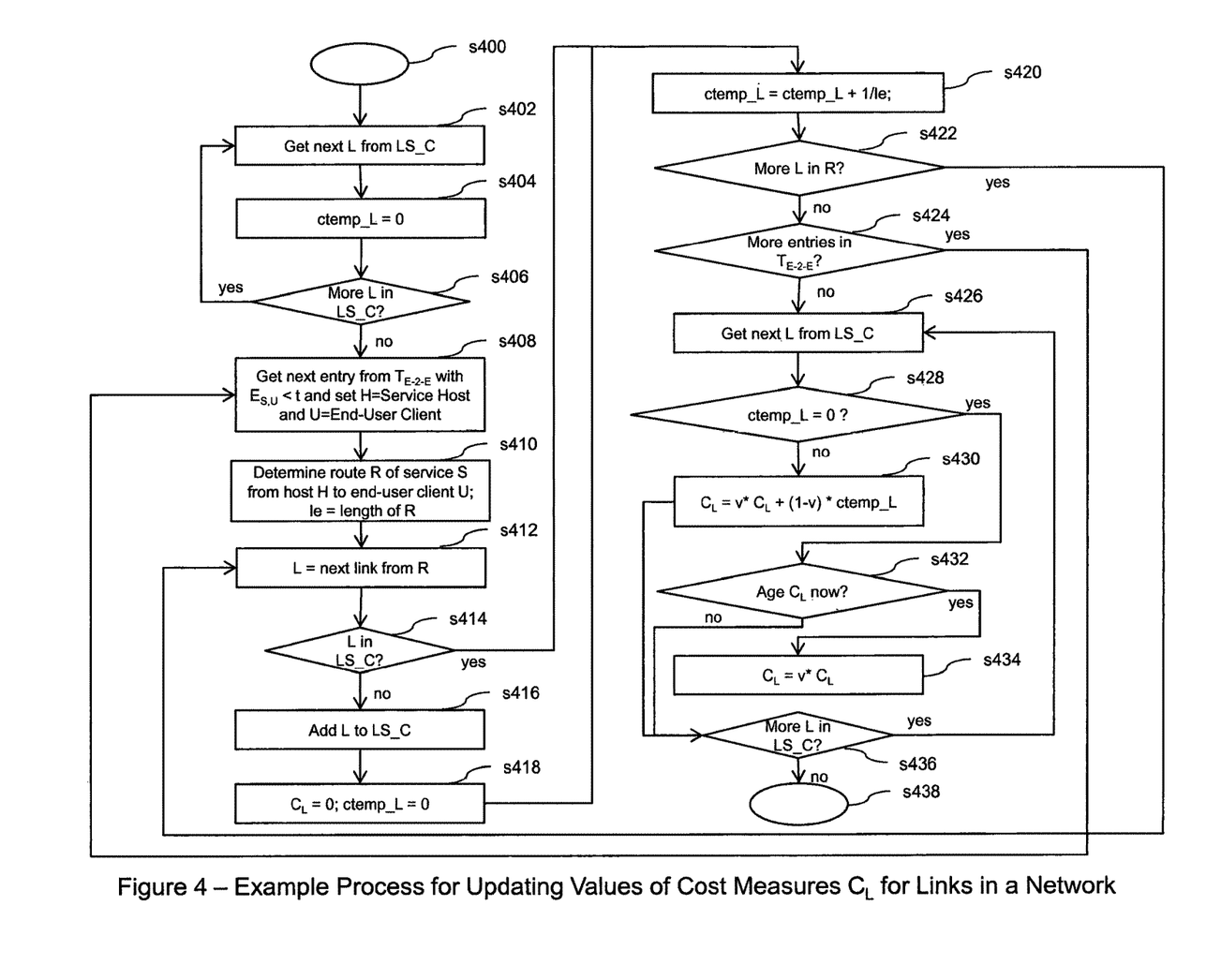
FIG. 4 is a flow-chart illustrating an example process for updating values of cost measures for links in a network.

Referring to FIG. 4, an algorithm to update the $C_L$ values for all links may be invoked periodically by the route analyser 10 to update $C_L$ values in respect of some or all of the links 125 in the network 100. It begins in step s400 and first runs a loop (s402-s406) where a counter ctemp_L is initialised to zero (s404) for each link L in the current link set LS_C, ctemp_L being a temporary variable. The route analyser maintains a link set LS_C where it stores all links it has encountered in any route and their respective $C_L$ values. If the link set LS_C has been exhausted in s406 the algorithm continues with two nested loops s408-s424. The outer loop s408-s424 runs over all entries in the table $T_{E-2-E}$. The inner loop s412-s422 runs over all links L in a particular route R. In s408 the route analyser retrieves the next entry from $T_{E-2-E}$ that has an $E_{S,U}$ score below a chosen threshold "t" (e.g. t=0.4, the level of which determines the level below which a route should be classed as poorly performing) and identifies service host H and end-user client U in respect thereof. In s410 the route R from H to U is determined based on information from the route database, and its length le (which may be measured as a number of hops) is established. The route R consists of a list of links, and the inner loop s412-s422 involves running through all links in the route to add a contribution to the ctemp_L count that reflects the chance that a particular link is responsible for having caused the $E_{S,U}$ score for the route it is in to have been below the threshold "t". In s414 it is established if the link is already contained in the current link set LS_C. If a link has not been seen by the route analyser, it gets a default $C_L$ value of 0, the link is added to the link set LS_C in s416, and counter ctemp_L is initialised to zero (s418). Otherwise the process continues directly with s420. In s420, the current sum for L is incremented in counter ctemp_L by an amount inversely proportional to the number of hops in the route. The process continues with the inner loop from s412 if the test in s422 reveals more links in the route R, otherwise it is checked in s424 if there are more unprocessed entries in $T_{E-2-E}$. If so the process continues with the outer loop from s408, otherwise it continues with s426. From s426, another loop s426-s436 starts in which the new $C_L$ values are computed for each link in the link set LS_C. The route analyser takes the next link from the link set LS_C in s426 and checks in s428 if the service counter is zero (to avoid divisions by zero). If the counter is not zero, $C_L$ is computed according to the formula in s430 which is a weighted average of the old $C_L$ value and the new ctemp_L count. A weight "v" between 0 and 1 is used here, similarly to the weight "w" used in the process of FIG. 3. If the counter is zero then $C_L$ is not recomputed and it is checked in s432 if the $C_L$ value should be aged (as explained in relation to FIG. 3, for example). If the decision is made to age the $C_L$ value, the formula in s434 is applied using the same weight v. Otherwise the process jumps to the end of the loop s436, where it is tested if more links are present in the link set LS_C and have to be processed. If there are more links left, the process continues with the loop from s428, otherwise the process for performing the algorithm completes at s438.

Exemplary pseudo-code which may be invoked periodically by a route analyser 10 according to an embodiment in order to update all $C_L$ values in the network using a process such as that described above and shown in FIG. 4 could be as follows:

```
For each L in LS_C
    ctemp_L = 0;
End
For each entry in T_{E-2-E} with E_{S,U} < t
    H = Service Host; U = End-User Client
    R = route(S,U);
```

-continued

```
        le = length(R);
        For each L in R
            If not(L in LS_C)
                then add L to LS_C; ctemp_L = 0; C_L = 0;
            end
            ctemp_L = ctemp_L + 1/le;
        End
    End
    For each L in LS_C
        if ctemp_L > 0
            then C_L = v * C_L + (1-v) * ctemp_L;
            else if time_to_age
                then C_L = v * C_L
            end
        end
    End
```

(NB The function route(S,U) determines all links on the current route R from service host H to end-user client U. The function length(R) returns the number of links/hops on the route.)

Use of $C_L$ Values $C_L$ values may be used similarly to $D_L$ values as described above (e.g. for diagnostics and for re-routing). $C_L$ values can also be directly used in cost calculations without needing to subtract them from 1 in order to obtain a cost value (as described above in relation to $D_L$). $C_L$ values may need to be scaled to be comparable to other cost metrics used by existing routing algorithms, however, depending on how much importance the operator wishes to apportion to $C_L$ compared to existing link cost measures.

It will be noted that $C_L$ values, like $D_L$ values, generally become more reliable when more routes are analysed and several consistent route overlaps through common links are found. Using too few routes might result in erroneous penalising of common links between these routes where congestion might actually have occurred elsewhere on the routes but the common links are penalised instead. Analysing several routes increases the likelihood of route overlaps and therefore improves the efficiency of diagnosis.

Predictive Usage

As indicated earlier, link performance measures determined according to some embodiments may be used predictively, rather than for immediate or direct use in routing or re-routing, however. The following discussion relates to this aspect.

For predictive usage, a multilayer perceptron (or similar machine learning or predictive data analytics algorithm) may be used. It will be understood that a multilayer perceptron is only one of many possible machine learning techniques that can be used, however.

In this example, the neural network comprises of an input layer, one or more hidden layers and one output layer. (A detailed discussion of how to configure and train a multilayer perceptron with training data will not be given here, as known techniques may be used.) The neural network learns the relationship between a route and its end-to-end performance to predict the latter, given the former.

Training the Neural Network

We explain here how the neural network may be built. Possible applications in prediction are described in the next section.

In this example, a route in the IP network is represented as a vector of component links. This is derived as explained in earlier sections (using routing protocols or RSVP). Each link is then represented for the neural network as a number of link performance metrics such as throughput, delay, jitter, MIB metrics, link cost including $D_L$ or $C_L$ values, etc. There should be at least one performance metric per link, and the metric set used should be consistent for all links, i.e. there should be no mix of different types of performance metrics for different links.

Links are represented in the input layer of the neural network by groups of input neurons. Each input neuron group contains one input neuron for each available link performance metric. The input layer of the multilayer perceptron contains enough groups of input neurons to accept link performance metrics for the longest possible route in the network. Shorter routes are padded by "perfect" links.

The purpose of the neural network is to predict the end-to-end performance of a route (i.e. the $E_{S,U}$ value) given a set of performance metrics for the component links of this route as well as an additional optional set of parameters (described in the next paragraph). The output layer of the neural network will have one output neuron for each type of end-to-end performance measure ($E_{S,U}$) that we want to consider. This is applicable if we use, for example, a different $E_{S,U}$ value for each service S provided by a service host H to an end-user client U. Alternatively, we can use separate neural networks for each $E_{S,U}$ value. This could be done if a single neural network turns out to be too hard to train using the available data, i.e. if its performance would be too low after training, for example.

The training data used for the neural network are vectors containing three groups of values:

1) n groups of k link performance values $l_j^{(i)}$ ($j^{th}$ value for $i^{th}$ link)
2) s optional parameters, $p_i$, which can be used to describe other relevant measures like time of day, amount of traffic on the route, number of services on the route etc.
3) m $E_{S,U}$ values, which we now call $e_i$.

$l_j^{(i)}$ and $p_i$ are input values. $e_i$ are the target values.

$(l_1^{(1)}, \ldots, l_k^{(1)}, l_1^{(2)}, \ldots, l_k^{(2)}, \ldots, l_1^{(n)}, \ldots, l_k^{(n)}, p_1, \ldots p_s, e_1, \ldots, e_m)$ If a route has fewer than n links, the missing link performance values are imputed by "perfect" link performance values, i.e. values representing maximum possible throughput, zero latency, zero jitter, etc. These perfect values are considered to be network parameters and are set by the operator. The exact values do not matter as long as they are genuinely describing optimal link performance in the network.

The data needed for building the neural network is collected by the route analyser 10. It uses information from the $T_{E-2-E}$ table described earlier plus additional link and network performance metrics that are available from the network 100. Network performance metrics can be obtained from Simple Network Management Protocol (SNMP) agents, resource reservation protocols such as Resource Reservation Protocol (RSVP), media control protocols such as RTP Control Protocol (RTCP) and Interior Gateway Protocol (IGP)/Multiprotocol Label Switching (MPLS)/multicast routing tables.

The training database will be constantly refreshed with new data and old data will be removed. For example, records older than 24 hours may be deleted. The neural network may be regularly retrained, for example, every hour, to make sure it constantly reflects the current network structure and behaviour.

After training, the neural network may be applied if a routing algorithm wants to predict the end-to-end performance of a given route. A route is mapped into a vector of component links, which is then represented as a sequence of input values for the neural network. The output of the neural network is the predicted end-to-end performance of the route, i.e. its predicted $E_{S,U}$ value. We refer to this predicted $E_{S,U}$ value as $PE_{S,U}$. This can be one or more values depending on the configuration of the neural network and the nature of the end-to-end performance measures used.

Application of the Neural Network

If a route is proposed by a routing algorithm for a given service, the route analyser uses the neural network to predict its end-to-end performance $PE_{S,U}$ as described in the previous section. The neural network produces an output value between 0 and 1. The routing algorithm can use the prediction to accept or discard a potential route or pick the best from a number of possible routes. This is the effect that the learning algorithm has on the network. Additionally, a predictive $D_L$ value ($PD_L$) and a predictive $C_L$ value ($PC_L$) can be computed as described in the "Diagnostic Usage" section earlier. The reason the values are predictive is that they are based on $PE_{S,U}$ values instead of actual $E_{S,U}$ values. Using such predictive performance indicators, the route analyser proactively determines links to avoid because they are expected to perform poorly, and therefore allows poor end-to-end performance to be avoided in the first place. This is different to re-routing using $E_{S,U}$, $D_L$ and $C_L$ values, which indicate that poor QoE has already occurred—using these measures for routing (in its most proactive form) only serves to prevent future drops of QoE. A non-predictive version may well run through cycles of poor and better end-to-end performance, whereas a predictive system may prevent poor end-to-end performance entirely after its initial training phase.

Worked Example

Consider the example network in FIG. 2, discussed earlier. This has four service hosts 110 (labelled as H1 to H4) providing services to three end-user clients 130 (U1 to U3) via a network which includes five intermediate forwarding nodes or routers 120 (N1 to N5) and thirteen links (L1 to L13), which provide nine possible end-to-end paths or routes for the delivery of services to the end-user clients. The routes or paths used for the services are indicated by the numbers 1 to 9 in dashed-line boxes. For example, path 1 goes from client H1 to router N1 via link L1, which also carries data using path 7, as indicated by the dashed-line box containing the path numbers "1, 7". Path 1 continues via link L6 to router N2, then via link L7 to router N3, and on via link L9 to end-user client U1, as indicated by dashed-line boxes on each of the relevant links containing the path number "1" (amongst other path numbers).

Service hosts H1-H4 maintain end-to-end performance tables with the following information:

TABLE 2

Table $T_{E\text{-}2\text{-}E}$ of end-to-end performance values maintained by video server H1

| Service | Class of Service | End-User Client | Time | Performance |
| --- | --- | --- | --- | --- |
| Video-stream | EF | U1 | 23/11/2012 11.00 | 0.77 |
| Video-stream | EF | U2 | 23/11/2012 11.00 | 0.86 |
| Video-stream | EF | U1 | 23/11/2012 18.00 | 0.98 |
| Video-stream | EF | U2 | 23/11/2012 18.00 | 0.84 |
| ... | ... | ... | ... | ... |

TABLE 3

Table $T_{E\text{-}2\text{-}E}$ of end-to-end performance values maintained by database server H2

| Service | Class of Service | End-User Client | Time | Performance |
| --- | --- | --- | --- | --- |
| Database | AF | U1 | 23/11/2012 11.00 | 0.58 |
| Database | AF | U2 | 23/11/2012 11.00 | 0.74 |
| Database | AF | U1 | 23/11/2012 18.00 | 0.67 |
| Database | AF | U2 | 23/11/2012 18.10 | 0.59 |
| ... | ... | ... | ... | ... |

TABLE 4

Table $T_{E\text{-}2\text{-}E}$ of end-to-end performance values maintained by video server H3

| Service | Class of Service | End-User Client | Time | Performance |
| --- | --- | --- | --- | --- |
| Video-stream | EF | U1 | 23/11/2012 20.00 | 0.77 |
| Video-stream | EF | U2 | 23/11/2012 20.00 | 0.21 |
| Video-stream | EF | U3 | 23/11/2012 20.00 | 0.19 |
| ... | ... | ... | ... | ... |

TABLE 5

Table $T_{E\text{-}2\text{-}E}$ of end-to-end performance values maintained by application server H4

| Service | Class of Service | End-User Client | Time | Performance |
| --- | --- | --- | --- | --- |
| Application | EF | U2 | 23/11/2012 20.00 | 0.25 |
| Application | EF | U3 | 23/11/2012 20.00 | 0.21 |
| ... | ... | ... | ... | ... |

In this example, H1 is a video server serving end-user clients U1 and U2 via routes 1 and 7; H2 is a database server serving U1 and U2 via routes 2 and 3; H3 is another video server providing a video stream to U1, U2 and U3 via routes 4, 5 and 8; and H4 is an application server serving U2 and U3 via routes 6 and 9.

We consider the computations for links L7 and L11. The computations for the other links work accordingly. We assume that an ageing mechanism happens only every 24 hours and is not relevant for this example. Every time a link value is updated this is done by averaging the previous value with the newly computed value. The threshold "t" for a low performing route/link is 0.40.

At 11:00 the following computation happens for L7. Assume the previous value is $D_7=0.78$ and $C_7=0$ $$D_7=(0.78+((0.77+0.86+0.58+0.74)/4))/2=0.75875$$

$C_7$ remains 0

At 18.00 we compute for $L_7$ $$D_7=(0.75875+((0.98+0.84+0.67+0.59)/4))/2=0.764375$$

$C_7$ remains 0

At 20.00 we compute for L7 and L11 (assume the previous values for L11 are $D11=0.55$ and $C_{11}=0$)

$$D_7=(0:764375+0.77)/2=0.7671875$$

$C_7$ remains 0

$$D_{11}=(0.55+((0.21+0.19+0.25+0.21)/4))/2=0.3825$$

Routes 5, 6, 8 and 9 are below the threshold of 0.40 which triggers the analysis for weak links in the route analyser. The links used by these routes are L4, L5, L11, L12 and L13. The length/e of each of the routes is 3. That means we obtain the following $C_L$ values:

$C_4$=0.67, $C_5$=0.67, $C_{11}$=1.33, $C_{12}$=0.67 and $C_{13}$=0.67.

If service hosts H3 and H4 request re-routing due to low performance, this can result in a better route that does not use link L11, identified as the most likely cause of low end-to-end performance for the services offered by H3 and H4 since it carries the largest $C_L$ value. For example, the video session from H3 to U2 could be rerouted via L3, L7 and L10, thus removing traffic from L11. For the sessions to U3 there are no alternative routes available for H3 and H4. However, removing traffic from L11 could result in a better performance.

If we assume that at 11.00 the traffic on route 1 is 25 Mb/s and that we have the following physical performance values for the links of route 1:

L1: loss=0.1%, delay=10 ms, jitter=2 ms
L6: loss=0.09%, delay=13 ms, jitter=1.5 ms
L7: loss=0.1%, delay=12 ms, jitter=1 ms
L9: loss=0.1%, delay=10 ms, jitter=1 ms If we also assume that the longest route is of length 4, then we obtain the following training data vector for the neural network at 11.00 for route 1:

(0.1, 10, 2, 0.09, 13, 1.5, 0.1, 12, 1, 0.1, 10, 1, 11, 0, 25, 0.77)

The first 12 values are link performance values, the next two values (11 and 0) are the hour and minute of the performance measurement, the next value is the traffic on the route and 0.77 is the reported end-to-end performance. Other training vectors are formed accordingly.

Figure 5:
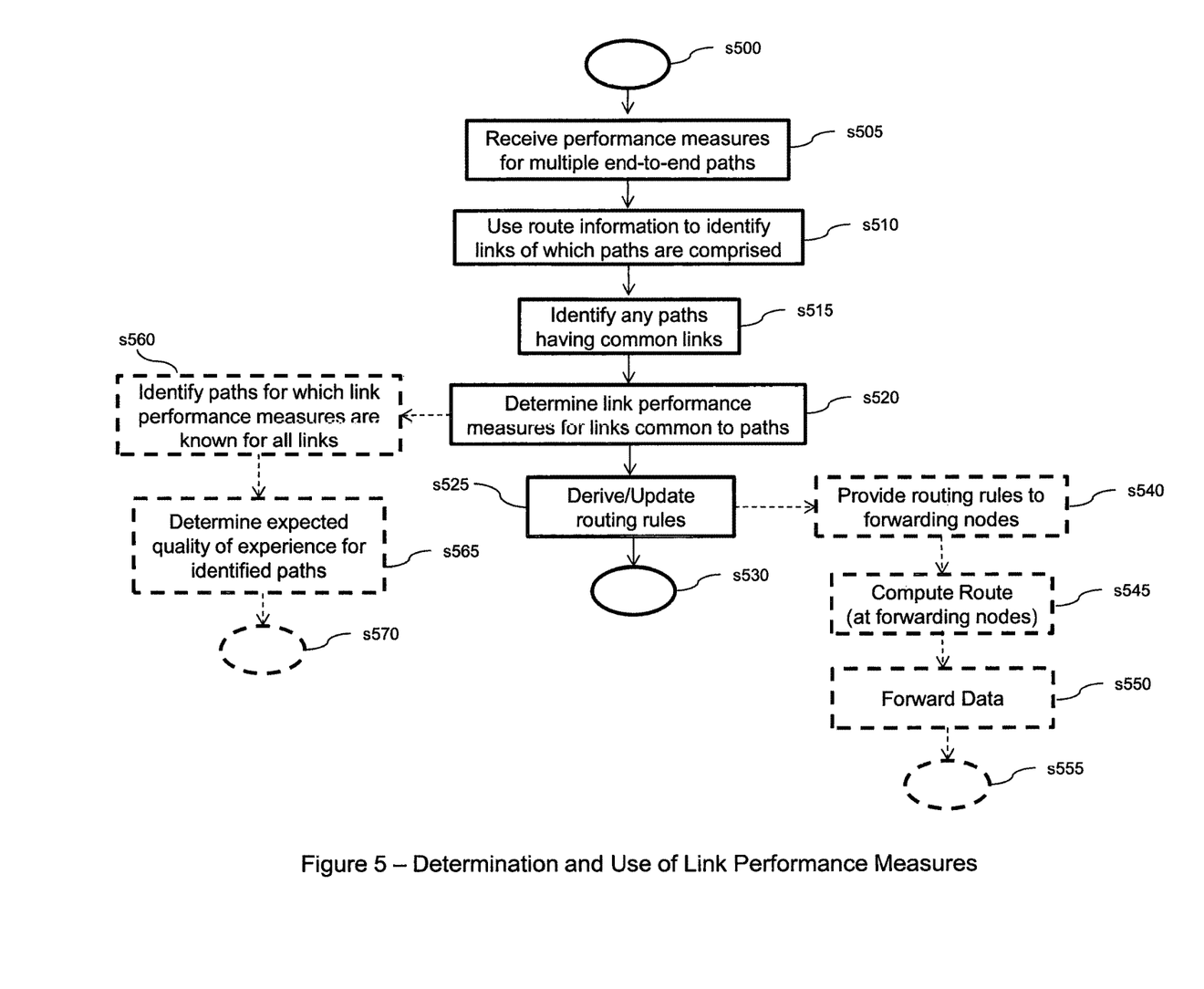
FIG. 5 is a flow-chart illustrating the determination and use of link performance measures according to embodiments of the invention.

Referring now to FIG. 5, this illustrates how link performance measures may be determined and used in various ways according to preferred embodiments. Steps s500 to s520 may be performed in a manner corresponding to the steps shown in the flow-charts of FIG. 3 or 4 (or otherwise), so will not be discussed again in detail.

Figure 6:
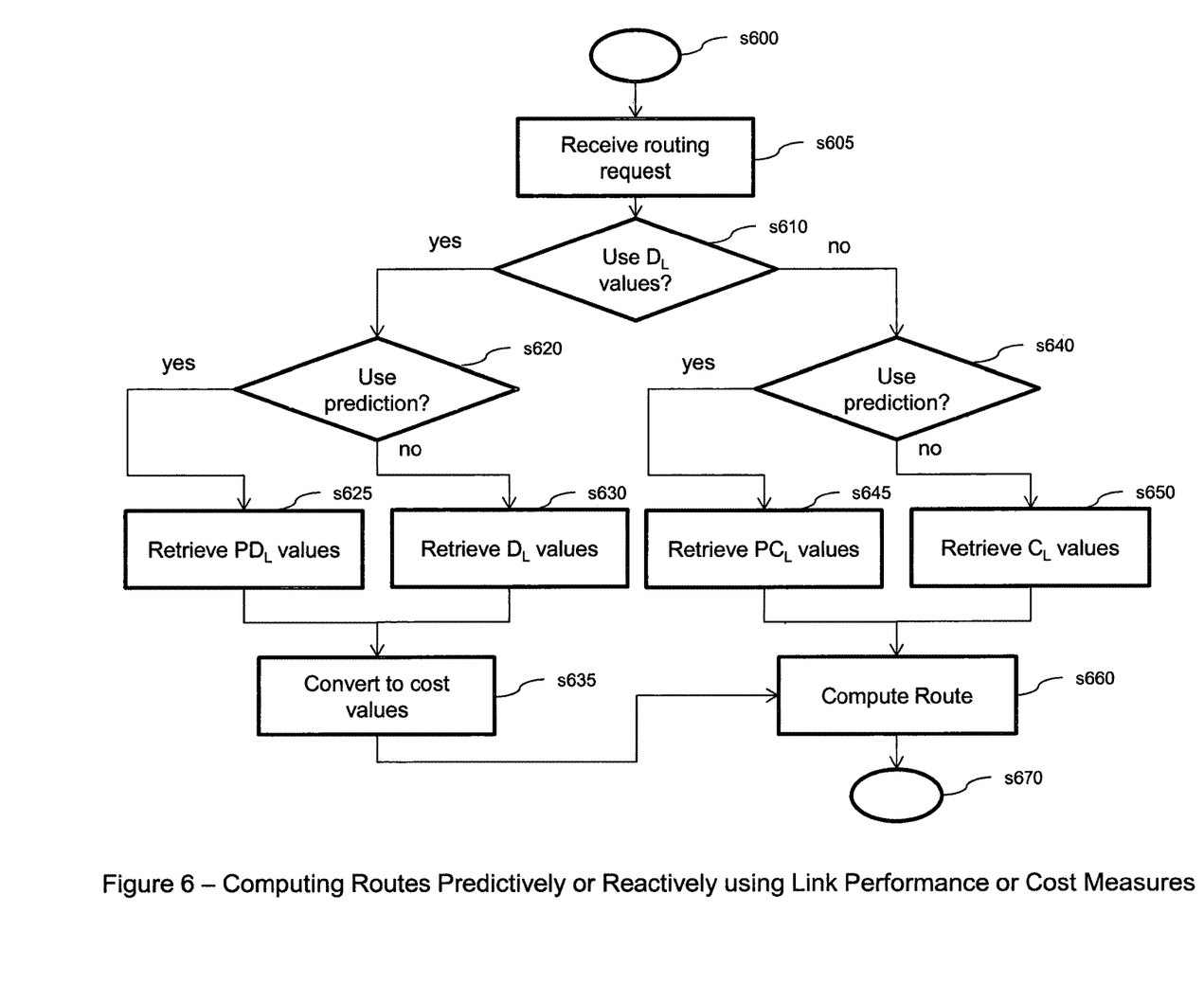
FIG. 6 is a flow-chart illustrating how routing algorithms may use link performance or cost measures, both predictive and reactive, according to embodiments of the invention.

Starting from step s500, following receipt of path performance measures (such as the $E_{S,U}$ measures referred to earlier in relation to FIGS. 3 and 4) for multiple end-to-end paths (s505), route information (such as the $R_{S,U}$ data referred to earlier) is used (s510) to identify the links of which the end-to-end paths in question are comprised. From this, it is possible to identify paths having links in common (s515), and thus to determine link performance measures ($D_L$, $C_L$ or otherwise) for those links (s520). Link performance measures so-determined can then be used in order to derive or update routing rules (s525), which may be done as shown in FIG. 6 (see below) or otherwise. The process may then end (s530) or be repeated. In addition, however, such new or updated routing rules may then be provided (s540) to network nodes (120 in FIG. 1) requiring them in order to take decisions as to how to forward data. These nodes may implement these new or updated rules in order to compute an appropriate route (s545), and thus to forward data on the computed route (s550). The process may then end (s555) or be repeated.

Alternatively or additionally, link performance measures determined as set out above may be used for making predictions of expected quality of experience for particular end-to-end paths where, for example, no current or recent end-to-end path data exists for those paths, but where it is or has been possible to determine link performance measures for all (or at least most) of the links making up those paths. Such a technique may involve identifying (at s560) one or more paths for which current or recent link performance measures are known for all (or most) links, then using the link performance measures for those links in order to determine quality of experience predictions for the end-to-end paths in question (s565). The process may then end (s570) or be repeated.

Referring now to FIG. 6, this illustrates how routes may be computed predictively or reactively using routing algorithms that may use link performance measures or cost measures. Looking at this in more detail, routes for forwarding data may be determined using routing algorithms that use link performance measures $D_L$, predictive link performance measures $PD_L$, link cost values $C_L$ or predictive link cost values $PC_L$. If $D_L$ or $C_L$ values are used (i.e. reactive techniques), the route may be computed based on current measured end-to-end performance and the current link performance ($D_L$) or cost ($C_L$). If the route is to be computed based on predicted end-to-end performance (i.e. predictive techniques), then $PD_L$ or $PC_L$ values are used by the routing algorithm.

Starting from step s600, following receipt of a routing request (s605), a first-stage decision is taken as to whether $D_L$ values or $C_L$ values are to be used (s610). A second-stage decision is then taken (s620 or s640) as to whether routes are to be computed predictively or reactively. Depending on the outcome of these stages, $PD_L$ values (step s625), $D_L$ values (step s630), $PC_L$ values (step s645) or $C_L$ values (step s650) are retrieved. In the case of $PC_L$ values or $C_L$ values, these may be used as they stand in order to compute a route (s660). In the case of $PD_L$ values or $D_L$ values, these may be converted to cost values ($PC_L$ or $C_L$) before then being used to compute a route (s660). The process may then end (s670) or be repeated.

The invention claimed is:

1. A method of determining a measure indicative of expected quality of experience in respect of data traversing a particular end-to-end path across a network, the particular end-to-end path comprising a plurality of communication links which together form a path via which data may traverse the network from a data-sending network-node to a data-receiving network-node, the method comprising, in respect of each of a plurality of links of which said particular end-to-end path is comprised, determining a link performance measure by:

receiving end-to-end path performance measures in respect of a plurality of monitored end-to-end paths across the network, the monitored end-to-end paths each comprising a plurality of links which together form a path for data to traverse the network from a data-sending network-node to a data-receiving network-node, the respective end-to-end path performance measures in respect of each monitored end-to-end path being dependent on and indicative of a network performance metric observed at the data-sending network node of that end-to-end path or at the data-receiving network-node of that end-to-end path; and determining, in dependence on end-to-end path performance measures received in respect of a plurality of monitored end-to-end paths having at least one link in common, and on the basis of route information identifying the links of which those end-to-end paths are comprised, one or more link performance measures, each of the one or more link performance measures relating to a link of which at least one of those end-to-end paths is comprised;

then:
    determining the measure indicative of expected quality of experience in respect of data traversing said particular end-to-end path in dependence on the respective link performance measures determined in respect of the plurality of monitored end-to-end paths;
    wherein said receiving end-to-end path performance measures comprises receiving end-to-end path performance measures from one or more data-sending network nodes and/or from one or more data-receiving network-nodes; and
    wherein the route information is obtained from data units that are intended to traverse, are traversing, or have traversed a path across the network.

2. The method according to claim 1 wherein the route information is obtained from a route information database.

3. The method according to claim 1 wherein the received end-to-end path performance measures comprise objective performance measures made in respect of characteristics indicative of network performance on the end-to-end path.

4. The method according to claim 1 wherein the received end-to-end path performance measures comprise subjective performance measures made in respect of characteristics indicative of network performance on the end-to-end path.

5. The method according to claim 1 wherein the data traversing the network has one of a plurality of categories associated therewith, and wherein the step of determining one or more link performance measures comprises identifying end-to-end path performance measures received in respect of data of one or more categories that is traversing the network, and determining, in dependence on end-to-end path performance measures received in respect of data of said one or more categories traversing a plurality of end-to-end paths having at least one link in common, and on the basis of route information identifying the links of which those end-to-end paths are comprised, one or more category-specific link performance measures, the or each category-specific link performance measure relating to performance in respect of said one or more categories of a link of which at least one of those end-to-end paths is comprised.

6. The method according to claim 5 wherein the categories, with which data traversing the network are associated, relate to class of service categories or type of service categories.

7. The method according to claim 1 wherein the data-forwarding nodes are nodes capable of implementing routing decisions whereby to forward data units via any of a plurality of links.

8. An apparatus for determining a measure indicative of expected quality of experience in respect of data traversing a particular end-to-end path across a network, the particular end-to-end path comprising a plurality of communication links which together form a path via which data may traverse the network from a data-sending network-node to a data-receiving network-node, the apparatus comprising:
    a receiver arranged to receive end-to-end path performance measures in respect of a plurality of monitored end-to-end paths across the network, the monitored end-to-end paths each comprising a plurality of links which together form a path for data to traverse the network from a data-sending network-node to a data-receiving network-node, the respective end-to-end path performance measures in respect of each monitored end-to-end path being dependent on and indicative of a network performance metric observed at the data-sending network node of that end-to-end path or at the data-receiving network-node of that end-to-end path; and
    a processing module operable to determine a link performance measure in respect of each of a plurality of links of which said particular end-to-end path is comprised by determining, in dependence on end-to-end path performance measures received in respect of a plurality of monitored end-to-end paths having at least one link in common, and on the basis of route information identifying the links of which those end-to-end paths are comprised, one or more link performance measures, each of the one or more link performance measures relating to a link of which at least one of those monitored end-to-end paths is comprised;
    the processing module further being operable to determine the measure indicative of expected quality of experience in respect of data traversing said particular end-to-end path in dependence on the respective link performance measures determined in respect of the plurality of monitored end-to-end paths; and
    wherein the route information is obtained from data units that are intended to traverse, are traversing, or have traversed a path across the network.

* * * * *